(12) United States Patent
Rizzi et al.

(10) Patent No.: US 12,438,165 B2
(45) Date of Patent: Oct. 7, 2025

(54) SYSTEMS AND METHODS FOR VENTILATING A FUEL CELL ENCLOSURE

(71) Applicant: HYDROGENICS CORPORATION, Mississauga (CA)

(72) Inventors: Justin Rizzi, Oshawa (CA); Paolo Forte, Maple (CA)

(73) Assignee: HYDROGENICS CORPORATION, Mississauga (CA)

( * ) Notice: Subject to any disclaimer, the term of this patent is extended or adjusted under 35 U.S.C. 154(b) by 618 days.

(21) Appl. No.: 17/888,201

(22) Filed: Aug. 15, 2022

(65) Prior Publication Data
US 2023/0062150 A1    Mar. 2, 2023

Related U.S. Application Data

(60) Provisional application No. 63/236,529, filed on Aug. 24, 2021.

(51) Int. Cl.
| | |
|---|---|
| *H01M 8/04089* | (2016.01) |
| *F04B 25/00* | (2006.01) |
| *F04D 17/12* | (2006.01) |
| *H01M 8/04014* | (2016.01) |
| *H01M 8/0662* | (2016.01) |
| *H01M 8/2475* | (2016.01) |

(52) U.S. Cl.
CPC ... *H01M 8/04089* (2013.01); *H01M 8/04014* (2013.01); *H01M 8/0662* (2013.01); *H01M 8/2475* (2013.01); *F04B 25/00* (2013.01); *F04D 17/12* (2013.01); *H01M 2250/10* (2013.01); *H01M 2250/20* (2013.01)

(58) Field of Classification Search
CPC ......... H01M 8/04089; H01M 8/04014; H01M 8/0662; H01M 8/2475; H01M 8/247; H01M 8/2465; H01M 2250/10; H01M 2250/20
See application file for complete search history.

(56) References Cited

U.S. PATENT DOCUMENTS

| | | | |
|---|---|---|---|
| 6,787,263 | B2 | 9/2004 | Walsh et al. |
| 8,486,575 | B2 | 7/2013 | Edwards et al. |
| 9,947,945 | B2 | 4/2018 | Cusumano et al. |
| 2005/0003528 | A1* | 1/2005 | Maeda ................ A61P 19/00 435/366 |
| 2014/0017581 | A1* | 1/2014 | Drouhault ......... H01M 8/04134 429/413 |
| 2019/0109331 | A1 | 4/2019 | Skala |
| 2019/0140293 | A1 | 5/2019 | Blanchet |
| 2021/0066732 | A1 | 3/2021 | Jenssen et al. |
| 2022/0352530 | A1* | 11/2022 | Rewers ............. H01M 8/04074 |

FOREIGN PATENT DOCUMENTS

| | | |
|---|---|---|
| CN | 211829050 | 10/2020 |
| CN | 113013444 | 6/2021 |
| DE | 102019209210 | 12/2020 |
| WO | WO2020260035 | * 12/2020 |

* cited by examiner

*Primary Examiner* — Matthew W Van Oudenaren
(74) *Attorney, Agent, or Firm* — Barnes & Thornburg LLP

(57) ABSTRACT

The present disclosure relates to systems and methods for efficiently ventilating hydrogen from a fuel cell enclosure.

20 Claims, 7 Drawing Sheets

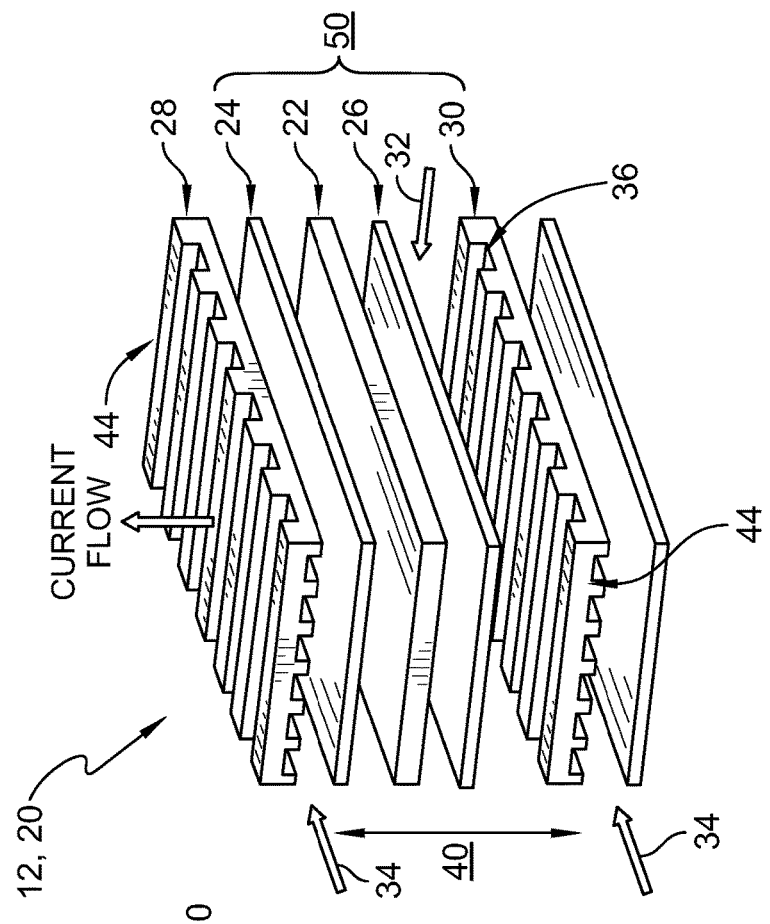
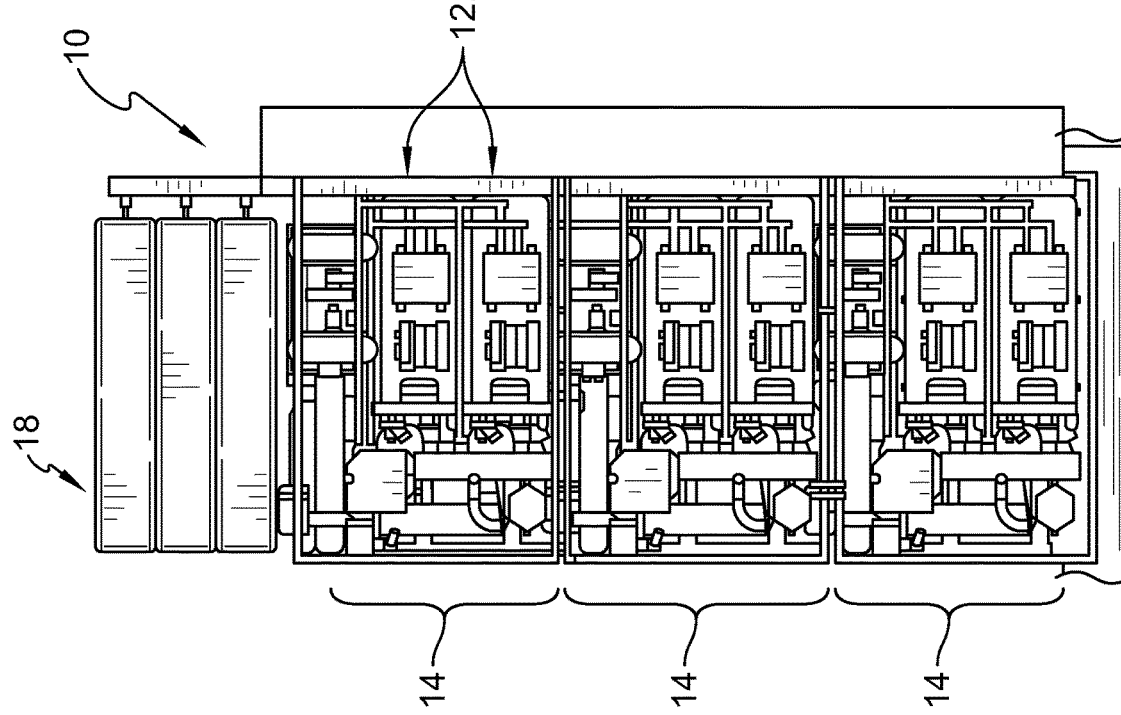
FIG. 1C
FIG. 1B

SYSTEMS AND METHODS FOR VENTILATING A FUEL CELL ENCLOSURE

CROSS-REFERENCE TO RELATED APPLICATIONS

This nonprovisional application claims the benefit and priority, under 35 U.S.C. § 119(e) and any other applicable laws or statutes, to U.S. Provisional Patent Application Ser. No. 63/236,529 filed on Aug. 24, 2021, the entire disclosure of which is hereby expressly incorporated herein by reference.

TECHNICAL FIELD

The present disclosure relates to systems and methods for ventilating a fuel cell enclosure.

BACKGROUND

Fuel cell systems are known for their efficient use of fuel to develop direct current (DC) electric power. In fuel cell systems, air is typically compressed by an air compressor, which draws in air from the atmosphere, compresses the air, and then feeds it to the stack through the fuel cell enclosure. During normal operation of an air compressor, the air compressor may siphon off some of the output air that it compresses to use within the air compressor itself for air cooling of internal fuel cell system components and for use in air-foil bearings. The siphoned off air may be referred to as a parasitic loss given that it reduces the volume of air that can be used at the fuel cell stack.

In existing fuel cell systems, this parasitic loss air is exhausted back into the atmosphere once it has been utilized for cooling and bearing purposes. The amount of air siphoned off is generally in the range of 5-10% of the total mass of compressed air flow. In addition to this siphoned air, a second parasitic air loss is required to ventilate a current fuel cell enclosure, which further limits the amount of air received at the stack from the air compressor.

Specifically, current fuel cell enclosures may be ventilated in order to maintain hydrogen concentrations below its lower explosive limit, which is necessary to prevent a fire or an explosion. This ventilation of the fuel cell enclosure is achieved by routing fresh, filtered air into the fuel cell enclosure in order to dilute the concentration of hydrogen. In existing systems, the fresh, filtered air is diverted from the output air of the compressor intended to feed the fuel cell stack forming the previously mentioned second parasitic loss.

The present disclosure is related to systems and methods for ventilating a fuel cell enclosure. In particular, the present disclosure is directed to a system, apparatus, and method of increasing the maximum efficiency and net output power of the fuel cell system by eliminating the need to divert compressed air to the fuel cell stack for ventilation. In addition, the present disclosure is directed to a system and method in which the parasitic loss air is captured and recycled by the fuel cell system to ventilate the fuel cell enclosure improving the efficiency and performance of the fuel cells and the fuel cell system.

SUMMARY

Embodiments of the present disclosure are included to meet these and other needs. In a first aspect of the present disclosure, described herein, a system or an apparatus for ventilating a fuel cell enclosure includes a fuel cell enclosure, an air compressor, a network of hosing, and an air stream. The fuel cell enclosure includes at least two fuel cell enclosure inlets and at least one fuel cell enclosure outlet. The air compressor includes at least one air compressor inlet and at least two air compressor outlets. The air stream includes a compressed air stream and a parasitic loss air stream.

The network of hosing includes at least four hose segments. A first hose segment of the first aspect includes a first free end and a second end coupled to the at least one air compressor inlet. A second hose segment includes a first end coupled to one of the at least two air compressor outlets and a second end coupled to one of the at least two fuel cell enclosure inlets. A third hose segment includes a first end coupled to the at least one fuel cell enclosure outlets and a second free end. A fourth hose segment includes a first end coupled to a second of the at least two air compressor outlets. The second hose segment and the third hose segment are included in a first flow path, and the fourth hose segment is included in a second flow path.

In some embodiments, the fourth hose segment may further include a second end coupled to a second of the at least two fuel cell enclosure inlets. The second flow path may further include the third hose segment. In some embodiments, the parasitic loss air stream may pass through a ventilation air cooler along the fourth hose segment.

In some embodiments, the network of hosing may further include a fifth hose segment. The fifth hose segment may include a first end coupled to a second of the at least one fuel cell enclosure outlet and a second free end. In some embodiments, the fifth hose segment may be included in the second flow path. In some embodiments, the parasitic loss air stream may pass through a ventilation air cooler along the fourth hose segment.

In some embodiments, the fuel cell enclosure may include a fuel cell or a fuel cell stack. In some embodiments, the fuel cell or the fuel cell stack may include hydrogen.

In some embodiments, the fourth hose segment may further include a second free end. In some embodiments, the network of hosing may include a fifth hose segment and a sixth hose segment. The sixth hose segment may include a first end joined to the fourth hose segment at a redirection point and a second end coupled to a second of the at least two fuel cell enclosure inlets. The fifth hose segment may include a first end coupled to a second of the at least one fuel cell enclosure outlet and a second end joined to the fourth hose segment at a return point. In some embodiments, the second flow path includes the sixth and fifth hose segment and the return point is located down-flow of the redirection point along the second flow path. In some embodiments, the parasitic loss air stream passes through a ventilation air cooler along the sixth hose segment. In some embodiments, the fuel cell enclosure includes a fuel cell or a fuel cell stack. In some embodiments, the fuel cell or fuel cell stack may include hydrogen.

In some embodiments, the at least one fuel cell enclosure outlet may include a pressure relief valve. In some embodiments, an air filter may be disposed along the first hose segment. In some embodiments, the first flow path may provide a travel path for the compressed air stream. In some embodiments, the second flow path may provide a travel path for the parasitic loss air stream.

In a second aspect of the present disclosure, a method of ventilating a fuel cell enclosure of a fuel cell system includes the steps of drawing an air stream into the fuel cell system through an air compressor, the air stream including a parasitic loss air stream and an enclosure exhaust air stream, expelling the parasitic loss air stream from the air compressor into a network of hosing, directing the parasitic loss air stream into the fuel cell enclosure by the network of hosing, and venting an enclosure exhaust air stream from the fuel cell enclosure.

In some embodiments, the parasitic loss air stream may be an exhausted air stream used to vent the air bearings of the air compressor. In some embodiments, expelling the parasitic loss air stream into the network of hosing may include passing parasitic loss air stream through a ventilation air cooler. In some embodiments, venting the enclosure exhaust air stream from the fuel cell enclosure may include pushing the enclosure exhaust air stream through the network of hosing. In some embodiments, the fuel cell enclosure may include a fuel cell or fuel cell stack. In some embodiments, the fuel cell or the fuel cell stack may use hydrogen.

In some embodiments, the network of hosing may provide at least one flow path. The at least one flow path may provide a travel path for the parasitic loss air stream. For example, the first flow path and/or the second flow path may provide a travel path for the parasitic loss air stream.

BRIEF DESCRIPTION OF THE DRAWINGS

FIG. 1B is an illustration of the fuel cell system including one or more fuel cell modules.

FIG. 1C is an illustration of components of a fuel cell in the fuel cell stack.

The features, aspects, and advantages of the present invention will become better understood when the following detailed description is read with reference to the accompanying drawings described herein.

DETAILED DESCRIPTION

Figure 1A:
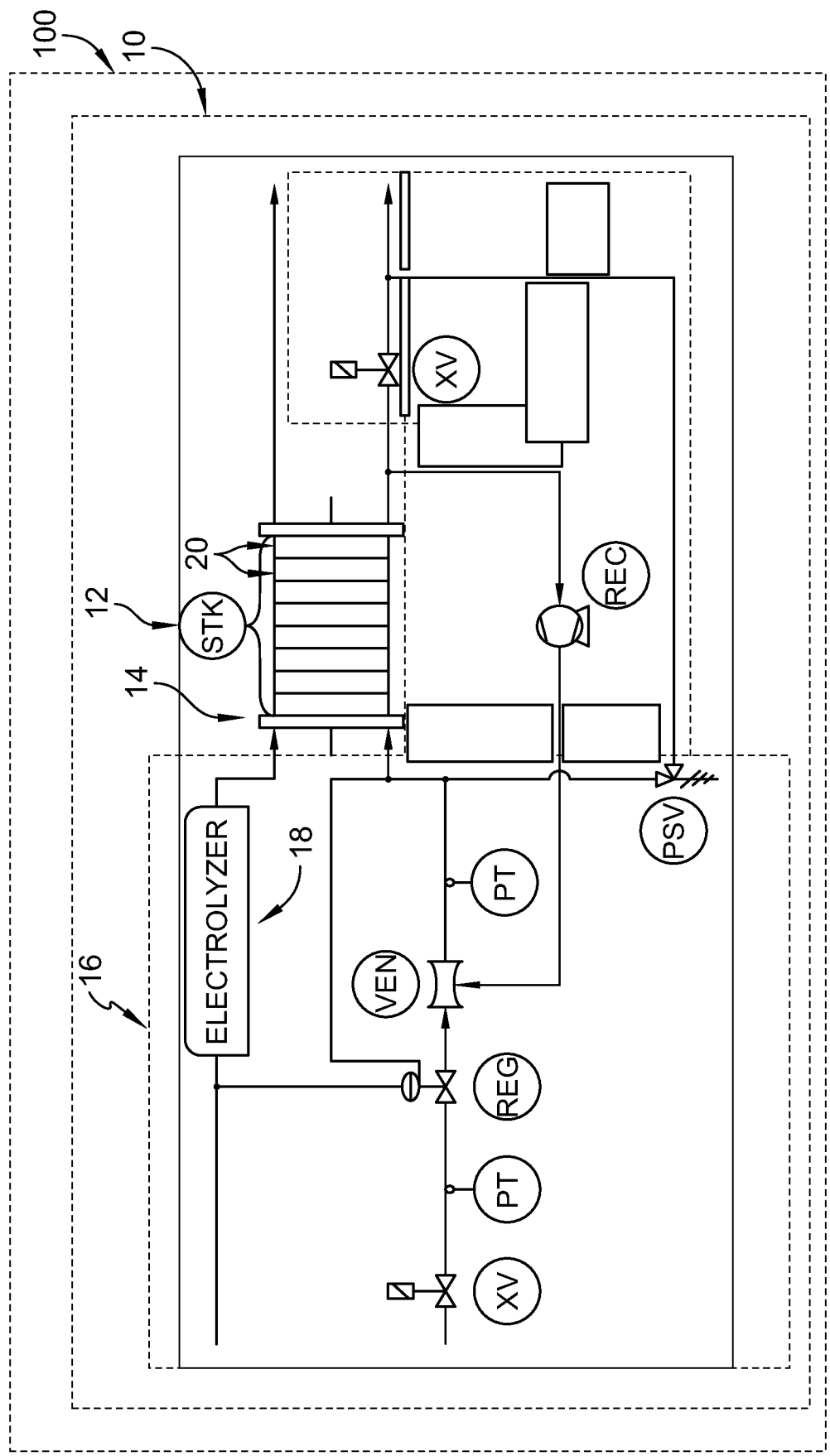
FIG. 1A is an illustration of a fuel cell system including one or more fuel cell stacks connected to a balance of plant.

As shown in FIG. 1A, a fuel cell system (e.g., a fuel cell apparatus) 10 often includes one or more fuel cell stacks 12 or fuel cell modules 14 connected to a balance of plant (BOP) 16, including various components, to create, generate, and/or distribute electrical power to meet modern day industrial and commercial needs in an environmentally friendly way. As shown in FIGS. 1B and 1C, a fuel cell system 10 may include fuel cell stacks 12 including a plurality of individual fuel cells 20. Each fuel cell stack 12 may house a plurality of fuel cells 20 connected together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA) 22 and a gas diffusion layer (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26. The above mentioned components, 22, 24, 26, 30 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plate (BPP) 28, 30 can uniformly distribute reactants 32, 34 to an active area 40 of each fuel cell 20 through oxidant flow fields 42 and/or fuel flow fields 44. The active area 40, where the electrochemical reactions occur to generate electrical power produced by the fuel cell 20, is centered within the gas diffusion layer (GDL) 24, 26 and the bipolar plate (BPP) 28, 30 at the membrane electrode assembly (MEA) 22. The bipolar plate (BPP) 28, 30 are compressed together to isolate and/or seal one or more reactants 32 within their respective pathways, channels, and/or flow fields 42, 44 to maintain electrical conductivity, which is required for robust during fuel cell 20 operation.

The fuel cell system 10 described herein, may be used in stationary and/or immovable power system, such as industrial applications and power generation plants. The fuel cell system 10 may also be implemented in conjunction with electrolyzers 18 and/or other electrolysis system 18. In one embodiment, the fuel cell system 10 is connected and/or attached in series or parallel to an electrolysis system 18, such as one or more electrolyzers 18 in the BOP 16 (see FIG. 1A). In another embodiment, the fuel cell system 10 is not connected and/or attached in series or parallel to an electrolysis system 18, such as one or more electrolyzers 18 in the BOP 16.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

The present disclosure relates to systems and methods for ventilating an enclosure of a fuel cell system 10. In exemplary embodiments, as previously mentioned, the fuel cell system 10 is a hydrogen fuel cell system, such as a polymer electrolyte membrane or proton exchange membrane (PEM) fuel cell system, an alkaline fuel cell (AFC) system, a molten carbonate fuel cell (MCFC) system, a phosphoric acid fuel cell (PAFC) system, or a solid oxide fuel cell (SOFC) system. In another embodiment, the fuel cell system may be any other type of fuel cell system that does not use diesel or gasoline as the fuel source. In an exemplary embodiment, the hydrogen fuel cell system may be a PEM fuel cell system.

Figure 2:
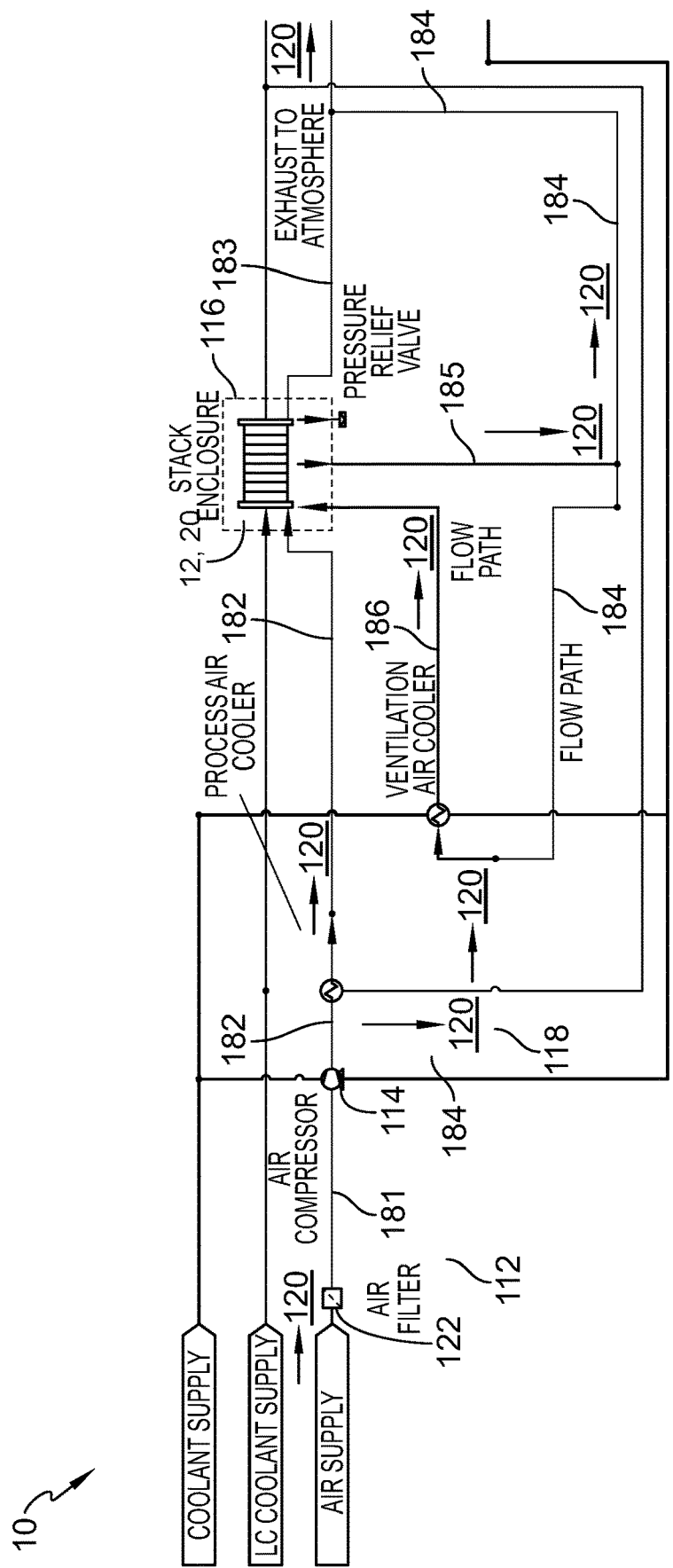
FIG. 2 is a schematic diagram of one embodiment of a fuel cell system including a ventilation system of the present disclosure.
Figure 3:
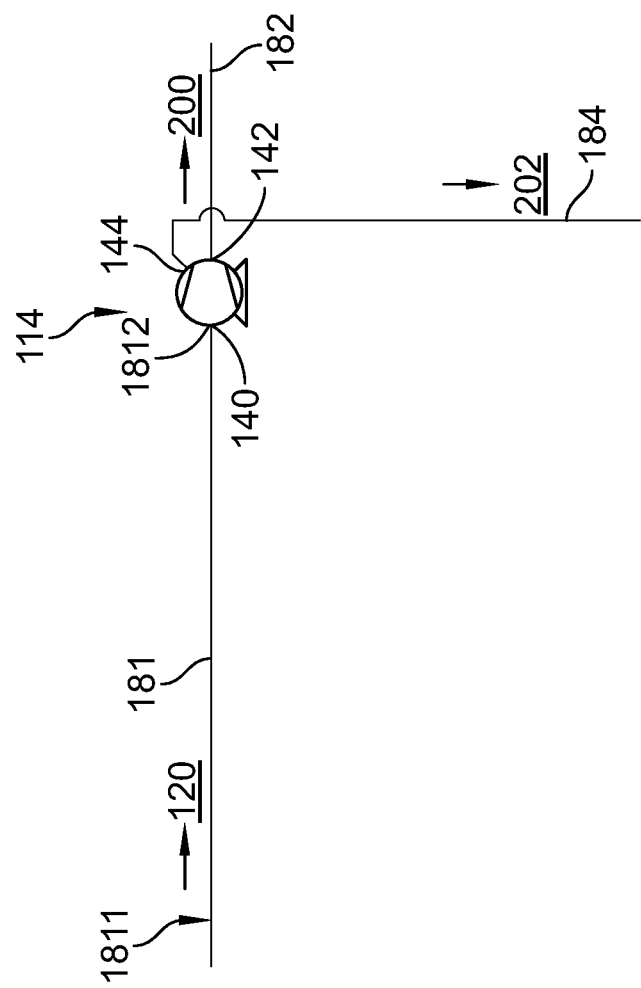
FIG. 3 is an enlarged view of one embodiment of an air compressor of a fuel cell system.

Referring to FIG. 2, the fuel cell system 10 comprises a ventilation system 112. In one embodiment, the ventilation system 112 may have an air compressor 114, a fuel cell enclosure 116, and a network of hosing 118, which couples the air compressor 114 to the fuel cell enclosure 116. The fuel cell system 10 operates when the air compressor 114 draws an air stream 120 into the ventilation system 112 directing the air stream 120 through the network of hosing 118 until the air stream 120 is expelled from the ventilation system 112, as depicted in FIG. 3. The fuel cell enclosure 116 may house or include one or more fuel cells 20 and/or one or more fuel cell stacks 16.

The air compressor 114 is configured to draw the air stream 120 into the system through an inlet 140, as can be seen in FIG. 3. The air compressor 114 is further configured to compress the air stream 120 such that it becomes a compressed air stream 200. The air compressor 114 may then push the compressed air stream 200 out of a first outlet 142, of at least two outlets 142/144 of the air compressor 114, as is illustrated in FIG. 3.

During normal operation of the air compressor 114, a portion of the air stream 120 is siphoned from the compressed air stream 200. The siphoned air stream 120 may be vented from the air compressor 114 through a second outlet 144 of the at least two outlets 142/144 of the air compressor 114. That siphoned air 120 becomes a parasitic loss air stream 202, as shown in FIG. 3.

In some embodiments, in addition to a first air inlet 140, the air compressor 114 may have multiple air inlets 140. Additional inlets 140 may, for example, receive the parasitic loss air stream 202 as a recycled air stream (not shown) to ventilate the air compressor 114. In other embodiments, the air compressor 114 may have multiple inlets 140 as part of an air compression system, such as an air compressor 114 that operates with two air compressor inlets 140. In one embodiment, the air compressor 114 comprising two air compressor inlets 140 may be or comprise a two-stage reciprocating piston air compression system. In another embodiment, the air compressor 114 comprising two air compressor inlets 140 may be or comprise a two-stage centrifugal compressor system (not shown).

Referring back to FIG. 2, the fuel cell enclosure 116 houses a fuel cell 20 or a fuel cell stack 12 of the fuel cell system 10. The fuel cell stack 12 may comprise different types of fuel 32, including but not limited to hydrogen, ethanol, methane, and/or natural gas. In an exemplary embodiment, the fuel 32 of the fuel cell system 10 is, comprises, consists essentially of, or consists of hydrogen.

Figure 4:
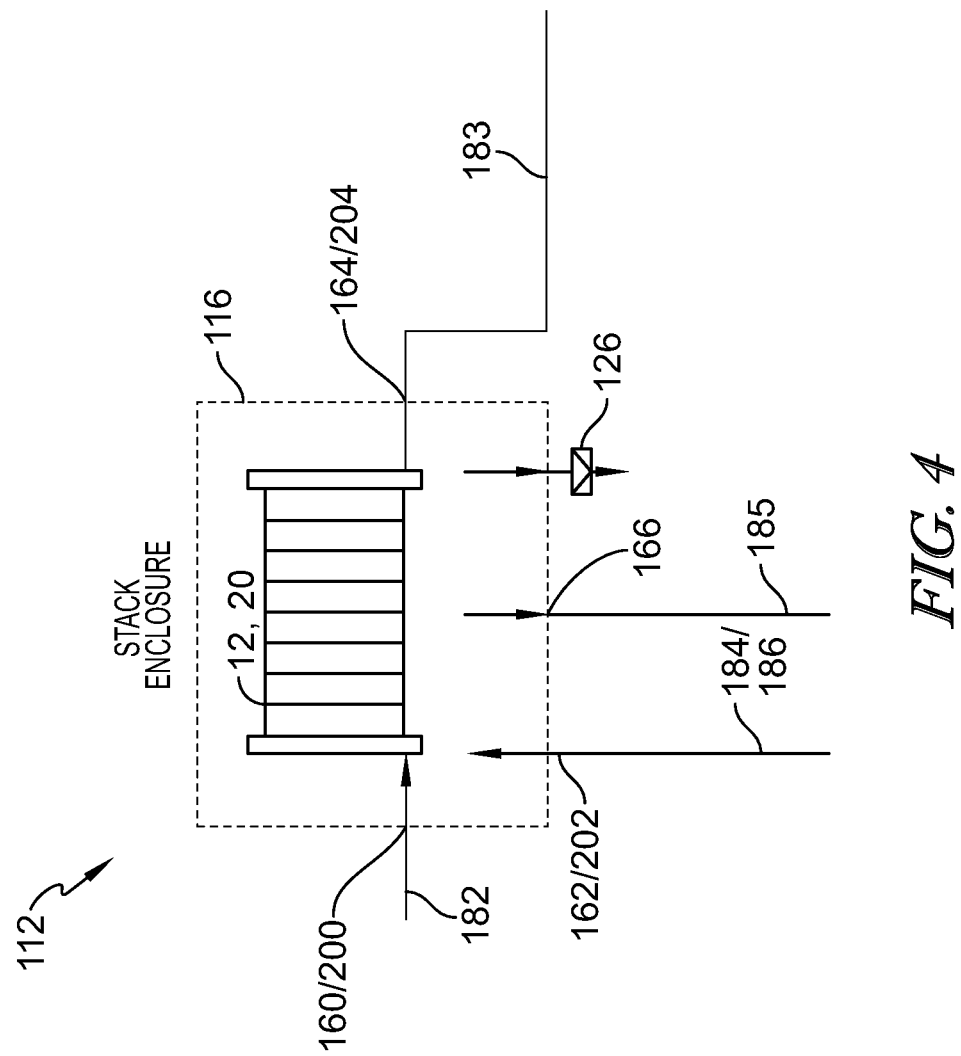
FIG. 4 is an enlarged view of one embodiment of a fuel cell enclosure of the present disclosure.

One embodiment of the fuel cell enclosure 116 may also comprise at least two fuel cell enclosure inlets 160/162. Yet in a further embodiment, the fuel cell enclosure 116 may comprise at least one fuel cell enclosure outlet 164, as shown in FIG. 4. In an exemplary embodiment, the fuel cell 116 comprises at least two fuel cell enclosure inlets 160/162 and at least one fuel cell enclosure outlet 164.

Figure 5A:
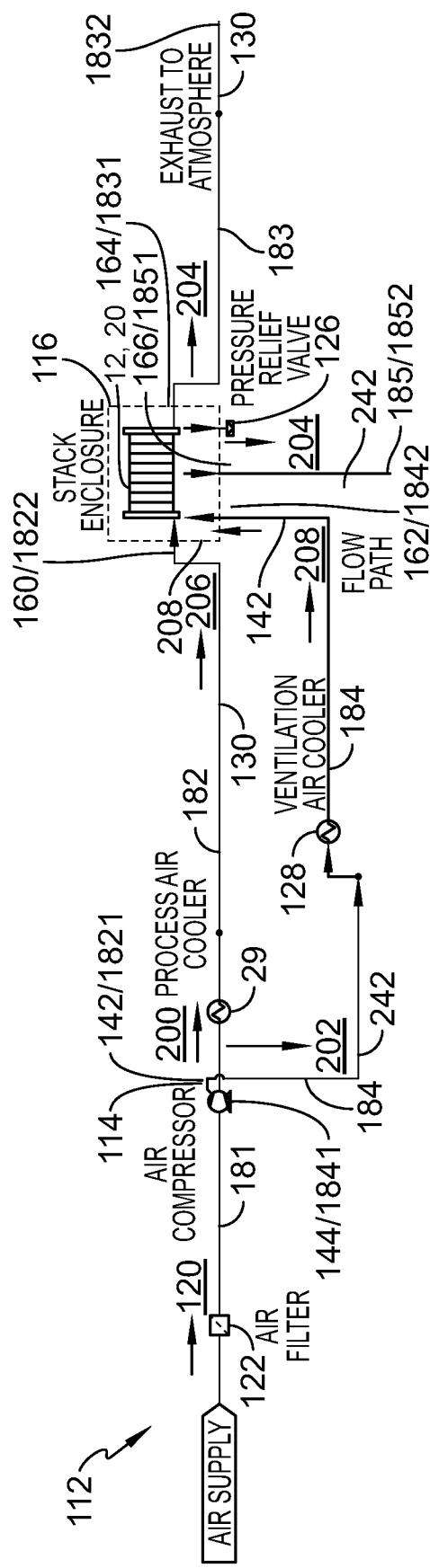
FIG. 5A is a schematic diagram of one embodiment of a second flow path of the present disclosure.
Figure 5B:
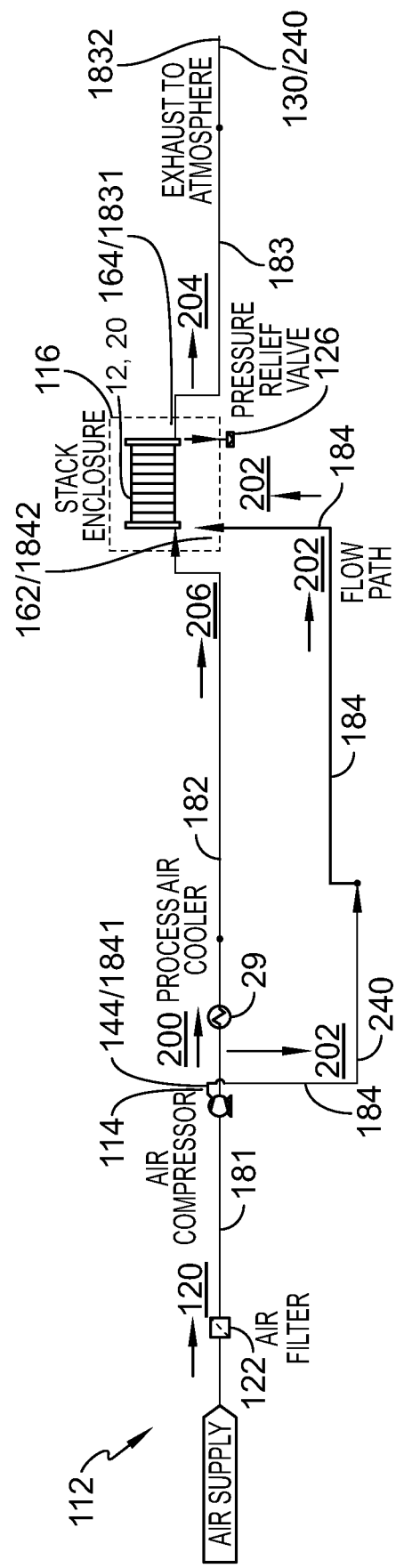
FIG. 5B is a schematic diagram of a second embodiment of the second flow path of the present disclosure.
Figure 6:
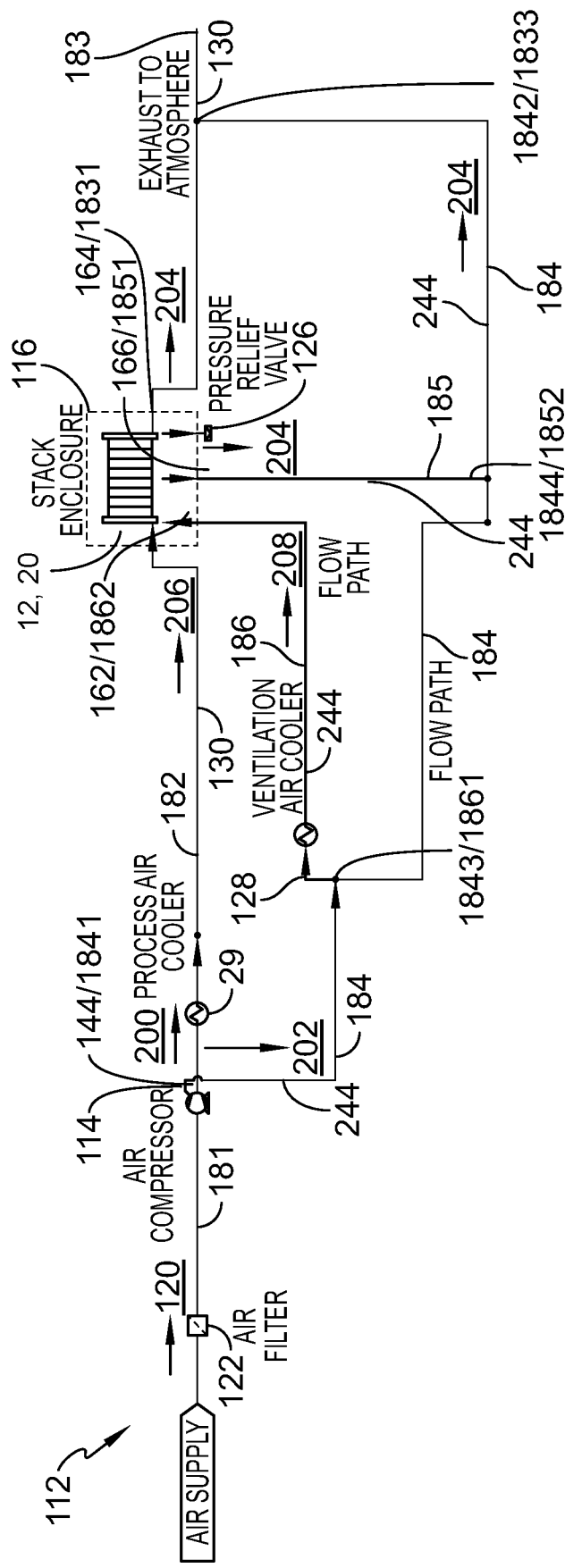
FIG. 6 is a schematic diagram of a third embodiment of the second flow path of the present disclosure.

The enclosure 116 of the ventilation system 112 receives the compressed air stream 200 through inlet 160 and the parasitic loss air stream 202 through inlet 162, as illustrated in FIGS. 4-6. Referring to FIG. 4, the compressed air stream 200 that enters the enclosure 116 is used by the fuel cell 20 or fuel cell stack 12 to create electricity. The parasitic loss air stream 202 that enters the enclosure 116 is used to ventilate the enclosure 116. To complete the ventilation process, the parasitic loss air stream 202 and any additional air within the enclosure 116 is vented from the outlet 164 of the enclosure 116 as an exhaust air stream 204. The exhaust air stream 204 is exhausted into the atmosphere.

In some embodiments, the enclosure 116 comprises additional inlets 160 to receive, for example, additional air for venting the enclosure 116. In other embodiments, the enclosure 116 is configured with additional outlets 166/126, as shown in FIG. 4.

As exemplified in FIGS. 5A-6, the additional outlets 164 may include a pressure relief valve 126, which may help remove the exhaust air stream 204 more quickly if or when the pressure in the fuel cell system 10 is too high. In the embodiments of FIGS. 5A-6, outlet 166 augments the normal operation of outlet 164, as a means to exhaust the enclosure exhaust air stream 204 from the ventilation system 112 into the atmosphere.

The network of hosing 118 may comprise one or more, two or more, three or more, multiple, several, and/or a plurality of hose segments 181/182/183/184/185/186, as shown in FIGS. 2-6. In some embodiments, a first hose segment 181 has a first free end 1811 that permits the entrance of the air stream 120 into the ventilation system 112, as depicted in FIG. 2. In another embodiment, the first hose segment 181 is coupled to the inlet 140 of the compressor 114 at a second end 1812 (see FIG. 3).

In some embodiments, an air filter 122 is disposed along the first hose segment 181, as shown in FIGS. 5A, 5B, and 6. In other embodiments, there is no air filter 122 comprised by the first hose segment 181. In further embodiments, there is no first hose segment 181 comprised by the ventilation system 112 of the fuel cell system 10.

As shown in FIGS. 5A-6, a second hose segment 182 and a third hose segment 183 cooperate to create a first flow path 130. The first flow path 130 is the travel path for the compressed air stream 200. The compressed air stream 200 travels from the air compressor 114 along the second hose segment 182 through the fuel cell enclosure 116. The compressed air further travels out of the fuel cell enclosure 116 of the ventilation system 112 along the third hose segment 183 on the first flow path 130.

To create the first flow path 130, a first end 1821 of the second hose segment 182 is coupled to the outlet 142 of the air compressor 114 (see FIG. 5A). A second end 1822 of the second hose segment 182 is coupled to the inlet 160 of the fuel cell enclosure 116. Further, a first end 1831 of the third hose segment 183 is coupled to outlet 164 of the enclosure 116. A second end 1832 of the third hose segment 183 is free (see FIG. 5A). Other embodiments of the first flow path 130 may comprise additional or different hose segments (not shown).

As shown in FIG. 5A-6, in further embodiments, in addition to the first hose segment 181 and the first flow path comprising the second hose segment 182 and the third hose segment 183, the network of hosing 118 creates a second flow path having different embodiments 40/242/44. The second flow path 40/242/44 is the travel path for the parasitic loss air stream 202. Specifically, parasitic loss air 202 in the second flow path 40/42/44 may travel from a second outlet 144 of the air compressor 114 through the fuel cell enclosure 116 and out of the ventilation system 112.

One embodiment of the second flow path 240 comprises the third hose segment 183 and a fourth hose segment 184, as can be seen in FIG. 5B. To create this embodiment of the second flow path 40, a first end 1841 of the fourth hose segment 184 is coupled to the outlet 144 of the air compressor 114 (see FIG. 5B) and a second end 1842 of the fourth hose segment 184 is coupled to inlet 162 of the fuel cell enclosure 116, as shown in FIG. 5B. Further, a first end 1831 of the third hose segment 183 is coupled to outlet 164 of the enclosure 116 and a second end 1832 of the third hose segment 183 is free (see FIG. 5B).

FIG. 5A illustrates another embodiment of the second flow path 242. This embodiment of the second flow path 242 comprises the fourth hose segment 184 and a fifth hose segment 185, as can be seen in FIG. 5A. To create this embodiment of the second flow path 242, a first end 1841 of the fourth hose segment 184 is coupled to the outlet 144 of the air compressor 114, as shown in FIG. 5A and a second end 1842 of the fourth hose segment 184 is coupled to inlet 162 of the fuel cell enclosure 116, as shown in FIG. 5A.

Further, this embodiment of the second flow path 242 comprises a fifth hose segment 185. A first end 1851 of the fifth hose segment 185 is coupled to an outlet 166 of the fuel cell enclosure 116 and a second end 1852 of the fifth hose segment 185 is free. In this embodiment of FIG. 5A, the ventilation system 112 comprises two outlets 164/166 from which to vent the fuel cell enclosure 116 exhaust air stream 204 to the environment or atmosphere.

Yet a further embodiment of the second flow path 244 is shown in FIG. 6. This embodiment of the second flow path 244 may include the fourth hose segment 184, the fifth hose segment 185, and a sixth hose segment 186, as can be seen in FIG. 6. To create the second flow path 244, a first end 1841 of the fourth hose segment 184 is coupled to the outlet 144 of the air compressor 114, as shown in FIG. 6. In this second flow path 244, the second end 1842 of the fourth hose segment 184 may be free or may be combined or connected to the third hose segment 183 in order to exhaust air stream from the fuel cell enclosure 116 to the environment or atmosphere (see FIG. 6).

In another embodiment of this second flow path 244, a first end 1861 of the sixth hose segment 186 is joined to the fourth hose segment 184. In one embodiment, the first end 1861 of the sixth hose segment 186 is joined to the fourth hose segment 184 at an interior redirection point 1843 (see FIG. 6). A second end 1862 of the sixth hose segment may be coupled to the inlet 162 of the fuel cell enclosure 116.

Additionally, a first end 1851 of the fifth hose segment 185 may be coupled to outlet 166 of the enclosure 116 (see FIG. 6) while a second end 1852 of the fifth hose segment 185 may be joined to the fourth hose segment 184 at an interior return point 1844. Some embodiments of the second flow path do not comprise the fifth hose segment 185 (see FIG. 5A).

Referring back to FIG. 6 that shows the fourth hose section 184 and the direction of flow of the parasitic loss air stream 202 for a second flow path embodiment 244. The redirection point 1843 is located down-flow or downstream of the first end 1841 of the fourth hose segment 184. The return point 1844 is located down-flow or downstream of the redirection point 1843. The second end 1842 of the fourth hose segment 184 is located down-flow or downstream of the return point 1844.

In such an embodiment of the second flow path 244, the parasitic loss air stream 202 flows from the compressor 114 to and through the redirection point 1843. Then, the parasitic loss air stream 202 flows to the fuel cell enclosure 116 through the sixth hose segment 186. The enclosure exhaust air stream 204 flows from the fuel cell enclosure 116 through the fifth hose segment 185 back to the fourth hose segment 184 at the return point 1844.

The enclosure exhaust air stream 204 is then vented from the ventilation system 112 at the second free end 1842 of the fourth hose segment 184. In some embodiments of the ventilation system 112 of FIG. 6, the second end 1842 of the fourth hose segment 184 vents the enclosure exhaust air stream 204 to the third hose segment 183 at an interior exhaust collection point 1833, as shown in FIG. 6. In this second flow path 244 embodiment of FIG. 6, the ventilation system 112 comprises two outlets 164/166 from which to vent the enclosure exhaust air stream.

In other embodiments of the present disclosure, any number of additional flow paths, such as a third flow path, a fourth flow path, and/or a fifth flow path (not shown) may be created and utilized to route the air streams 120 by the network of hosing 18. The additional flow paths may facilitate multiple fuel cell stacks 12 in multiple fuel cell enclosures 116 to work in series, allow multiple air compressors 114 to feed the fuel cell stacks 12, direct enclosure exhaust air streams 204 to vent at a particular location, capture and redirect or reuse gases inherent to the system, and/or permit any other use.

Under normal operation, the process of creating electricity by a fuel cell 20 or fuel cell system 10 creates heat. Heat can build up in the fuel cell enclosure 116 creating a risk of high pressure, reduced efficiency, and a shorter lifespan of the fuel cells and fuel cell stacks 12 within the enclosure 116. To combat the heat generated by the fuel cell 12 operation, in some embodiments of the ventilation system 112 and fuel cell system 10, air cooling devices 28/29 may be utilized to cool air stream 20/200/202 prior to it entering the fuel cell enclosure 116.

For example, the compressed air stream 200 of the present systems 10 and 112, may pass through a process air cooler 29 along the second hose segment 182, as shown in FIGS. 5A-6. The compressed air stream is processed by the process air cooler 29 to create a processed air stream 206. The processed air stream 206 then enters the fuel cell enclosure 116 through inlet 160 (see FIGS. 5A-6).

Cooling the air stream 20/202 used to ventilate the enclosure 116 further reduces the heat buildup in the fuel cell system 10. In some embodiments of the ventilation system 112, the parasitic loss air stream 202 passes through a ventilation air cooler 28. For example, in some embodiments, the parasitic loss air stream 202 passes through a ventilation air cooler 128 along the fourth hose segment 184 (see FIG. 5A). In additional embodiments, parasitic loss air stream 202 passes through a ventilation air cooler 128 along the sixth hose segment 186 (see FIG. 6).

The parasitic air stream 202 is cooled by the ventilation air cooler 128 to create a cooled ventilation air stream 208. The cooled ventilation air stream 208 then enters the fuel cell enclosure 116 through inlet 162 (see FIG. 6). Ventilating the enclosure 116 with the cooled ventilation air stream 208 versus the parasitic loss air stream 202 has advantages and benefits. Specifically, cooling the fuel cell enclosure 116 with the cooled ventilation air stream 208 may result in a reduction of temperature inside the fuel cell enclosure 116 ranging from about 5 degrees to about 20 degrees including all specific and range of temperatures comprised therein. This reduction in temperature can extend the life of the components and electronics of the fuel cell 124 and fuel cell system 10, thus increasing the lifespan, performance, and efficiency of the fuel cell system 10.

The present disclosure is also directed to a method of ventilating the fuel cell enclosure 116. The present method of ventilating the fuel cell enclosure 116 comprises the steps of drawing an air stream 120 into the fuel cell system 10 through an air compressor 14. The air stream 120 may comprise a parasitic loss air stream 202 and an enclosure exhaust air stream 204.

The present method of ventilating the fuel cell enclosure 116 may further comprise the steps of expelling the parasitic loss air stream 202 from the air compressor 114 into a network of hosing 18. The method also comprises directing the parasitic loss air stream 202 into a fuel cell enclosure 116 by the network of hosing 18. In addition, the method comprises venting the enclosure exhaust air stream 204 from the fuel cell enclosure 116.

In some embodiments of the present method, the parasitic loss air stream 202 passes through a ventilation air cooler 28. In other embodiments of the present method, an exhausted air stream (not shown) may be recirculated into the system 10/112. The recirculated exhausted air stream may be utilized to vent the air bearings of the air compressor to create the parasitic loss air stream 202. Therefore, the parasitic loss air stream 202 may be an exhausted air stream used to vent the air bearings of the air compressor.

The following described aspects of the present invention are contemplated and non-limiting:

A first aspect of the present invention relates to a system or apparatus for ventilating a fuel cell enclosure. The system includes a fuel cell enclosure, an air compressor, a network of hosing, and an air stream. The fuel cell enclosure includes at least two fuel cell enclosure inlets and at least one fuel cell enclosure outlet. The air compressor includes at least one air compressor inlet and at least two air compressor outlets. The air stream includes a compressed air stream and a parasitic loss air stream.

The network of hosing includes at least four hose segments. A first hose segment of the first aspect includes a first free end and a second end coupled to the at least one air compressor inlet. A second hose segment includes a first end coupled to one of the at least two air compressor outlets and a second end coupled to one of the at least two fuel cell enclosure inlets. A third hose segment includes a first end coupled to the at least one fuel cell enclosure outlet and a second free end. A fourth hose segment includes a first end coupled to a second of the at least two air compressor outlets. The second hose segment and the third hose segment are included in a first flow path, and the fourth hose segment is included in a second flow path.

A second aspect of the present invention relates to a method of ventilating a fuel cell enclosure of a fuel cell system. The method includes the steps of drawing an air stream into the fuel cell system through an air compressor, the air stream including a parasitic loss air stream and an enclosure exhaust air stream, expelling the parasitic loss air stream from the air compressor into a network of hosing, directing the parasitic loss air stream into the fuel cell enclosure by the network of hosing, and venting an enclosure exhaust air stream from the fuel cell enclosure.

In the first aspect of the present invention, the fourth hose segment may further include a second end coupled to a second of the at least two fuel cell enclosure inlets. The second flow path may further include the third hose segment. In the first aspect of the present disclosure, the parasitic loss air stream may pass through a ventilation air cooler along the fourth hose segment.

In the first aspect of the present invention, the network of hosing may further include a fifth hose segment. The fifth hose segment may include a first end coupled to a second of the at least one fuel cell enclosure outlet and a second free end. In the first aspect of the present disclosure, the fifth hose segment may be included in the second flow path. In the first aspect of the present disclosure, the parasitic loss air stream may pass through a ventilation air cooler along the fourth hose segment. In the first aspect of the present invention, the fuel cell enclosure may include a fuel cell or fuel cell stack. In the first aspect of the present disclosure, the fuel cell or the fuel cell stack may include hydrogen.

In the first aspect of the present invention, the fourth hose segment may further include a second free end. In the first aspect of the present invention, the network of hosing may include a fifth hose segment and a sixth hose segment. The sixth hose segment may include a first end joined to the fourth hose segment at a redirection point and a second end coupled to a second of the at least two fuel cell enclosure inlets, and the fifth hose segment may include a first end coupled to a second of the at least one fuel cell enclosure outlet and a second end joined to the fourth hose segment at a return point. In the first aspect of the present invention, the second flow path includes the sixth and fifth hose segment and the return point may be located down-flow of the redirection point along the second flow path. In the first aspect of the present invention, the parasitic loss air stream may pass through a ventilation air cooler along the sixth hose segment. In the first aspect of the present invention, the fuel cell enclosure may include a fuel cell or a fuel cell stack. In the first aspect of the present invention, the fuel cell or fuel cell stack may include hydrogen.

In the first aspect of the present invention, the at least one fuel cell enclosure outlet may include a pressure relief valve. In the first aspect of the present invention, an air filter may be disposed along the first hose segment. In the first aspect of the present invention, the first flow path may provide a travel path for the compressed air stream. In the first aspect of the present invention, the second flow path may provide a travel path for the parasitic loss air stream.

In the second aspect of the present invention, the parasitic loss air stream may be an exhausted air stream used to vent the air bearings of the air compressor. In the second aspect of the present invention, expelling the parasitic loss air stream into the network of hosing may include passing parasitic loss air stream through a ventilation air cooler. In the second aspect of the present invention, venting the enclosure exhaust air stream from the fuel cell enclosure may include pushing the enclosure exhaust air stream through a network of hosing. In the second aspect of the present invention, the fuel cell enclosure may include a fuel cell or fuel cell stack. In the second aspect of the present invention, the fuel cell or the fuel cell stack may use hydrogen. In the second aspect of the present invention, the network of hosing may provide at least one flow path. The at least one flow path may provide a travel path for the parasitic loss air stream. For example, the first flow path and/or the second flow path may provide a travel path for the parasitic loss air stream.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein The above embodiments and aspects are described in sufficient detail to enable those skilled in the art to practice what is claimed and it is to be understood that other embodiments may be utilized and that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values include, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third," and the like, as used herein do not denote any order or importance, but rather are used to distinguish one element from another. The term "or" and "and/or" is meant to be inclusive and mean either, all, or any combination of the listed items. In addition, the terms "connected" and "coupled" are not restricted to physical or mechanical connections or couplings, and can include electrical connections or couplings, whether direct or indirect. Direct connection and/or coupling can include such connections and/or couplings where no intermittent connection or component is present between two endpoints, components or items. Indirect connection and/or coupling can include where there is one or more intermittent or intervening connections and/or couplings present between respective endpoints, components or items.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps. The phrase "consisting of" or "consists of" refers to a compound, composition, formulation, or method that excludes the presence of any additional elements, components, or method steps.

The term "consisting of" also refers to a compound, composition, formulation, or method of the present disclosure that excludes the presence of any additional elements, components, or method steps. The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A system for ventilating a fuel cell enclosure, the system comprises:
    a fuel cell enclosure comprising at least two fuel cell enclosure inlets and at least one fuel cell enclosure outlet,
    an air compressor comprising at least one air compressor inlet and at least two air compressor outlets,
    a networking of hosing comprising at least six hose segments,
        wherein a first hose segment comprises a first free end and a second end coupled to the at least one air compressor inlet,
        wherein a second hose segment comprises a first end coupled to one of the at least two air compressor outlets and a second end coupled to one of the at least two fuel cell enclosure inlets,
        wherein a third hose segment comprises a first end coupled to the at least one fuel cell enclosure outlet and a second free end,
        wherein a fourth hose segment comprises a first end coupled to a second of the at least two air compressor outlets,
        wherein a fifth hose segment comprises a first end coupled to a second of the at least one fuel cell enclosure outlet and a second end joined to the fourth hose segment at a return point, and
        wherein a sixth hose segment comprises a first end joined to the fourth hose segment at a redirection point and a second end coupled to a second of the at least two fuel cell enclosure inlets,
        wherein the second hose segment and the third hose segment are comprised by a first flow path while the fourth hose segment is comprised by a second flow path, and
    an air stream comprising a compressed air stream and a parasitic loss air stream.

2. The system of claim 1, wherein the fourth hose segment further comprises a second end coupled to the third hose segment.

3. The system of claim 1, wherein the parasitic loss air stream passes through a ventilation air cooler along the sixth hose segment.

4. The system of claim 1, wherein the fuel cell enclosure comprises a fuel cell or a fuel cell stack.

5. The system of claim 1, wherein the second flow path further comprises the sixth and fifth hose segments and the return point is located down-flow of the redirection point along the second flow path.

6. The system of claim 5, wherein the parasitic loss air stream passes through a ventilation air cooler along the sixth hose segment.

7. The system of claim 1, wherein the at least one fuel cell enclosure outlet includes a pressure relief valve.

8. The system of claim 1, wherein an air filter is disposed along the first hose segment.

9. The system of claim 1, wherein the first flow path provides a travel path for the compressed air stream.

10. The system of claim 1, wherein the second flow path provides a travel path for the parasitic loss air stream.

11. A method of ventilating a fuel cell enclosure of a fuel cell system, the method comprising:
    drawing an air stream into the fuel cell system through an air compressor, the air stream comprising a parasitic loss air stream and an enclosure exhaust air stream,
    expelling the parasitic loss air stream from the air compressor into a network of hosing,
    directing the parasitic loss air stream into the fuel cell enclosure by the network of hosing, and
    venting the enclosure exhaust air stream from the fuel cell enclosure,
    wherein the parasitic loss air stream is an exhausted air stream used to vent air bearings of the air compressor.

12. The method of claim 11, wherein expelling the parasitic loss air stream into the network of hosing comprises passing the parasitic loss air stream through a ventilation air cooler.

13. The method of claim 11, wherein the fuel cell enclosure comprises a fuel cell or a fuel cell stack, and the fuel cell or the fuel cell stack comprises hydrogen.

14. The method of claim 11, wherein the network of hosing provides at least one flow path, the at least one flow path providing a travel path for the parasitic loss air stream.

15. The system of claim 4, wherein the fuel cell or the fuel cell stack comprises hydrogen.

16. The method of claim 11, wherein venting the enclosure exhaust air stream from the fuel cell enclosure comprises pushing the enclosure exhaust air stream through the network of hosing.

17. The system of claim 1, wherein the redirection point is located down-flow of the first end of the fourth hose segment.

18. The system of claim 2, wherein the second end of the fourth hose segment is located down-flow of the return point.

19. The system of claim 1, wherein the compressed air stream passes through a process air cooler along the second hose segment.

20. The method of claim 11, further comprising passing the air stream through an air filter.

* * * * *